United States Patent Office 3,692,511
Patented Sept. 19, 1972

3,692,511
LIMESTONE GRANULATION
Joseph F. Wilson and Wallace D. Southworth, Bartlesville, Okla., assignors to Phillips Petroleum Company
No Drawing. Continuation of abandoned application Ser. No. 694,391, Dec. 29, 1967. This application Nov. 17, 1970, Ser. No. 90,458
Int. Cl. C05c 9/00
U.S. Cl. 71—29     7 Claims

ABSTRACT OF THE DISCLOSURE

Limestone particles are granulated by charging a binder material and water to a tumbling bed of particulate limestone and separating granules of a specific size from the tumbled material. The granules are of suitable size for use in conventional fertilizer application equipment, are essentially round, and extremely hard, yet decompose readily upon contact with the soil.

This application is a continuation of Ser. No. 694,391, filed Dec. 29, 1967 and now abandoned.

This invention relates to a process for granulating particulate limestone. In another aspect it relates to fertilizer material composed of a binder material, limestone, and water. In a further aspect, it relates to a method of granulating limestone particles utilizing water and a binder material to produce a granulated fertilizer composition which may be utilized in conventional fertilizer application equipment.

It has been recognized for many years that powdered limestone was a potentially valuable material as a soil conditioning material. Various attempts have been made to incorporate this by-product from limestone crushing plants into a fertilizer composition suitable for use in conventional fertilizer application equipment. Numerous problems have arisen however with the products and the processes utilized in the prior art. For example, prior processes require expensiv equipment to provide a satisfactory granule. Moreover, capital investment has remained relatively high because no process has been developed which did not require drying apparatus to reduce the moisture content of the limestone granules.

In addition, problems with the resulting product have rendered it unsatisfactory for use in modern fertilizer application equipment. In particular, no one has provided to the art a limestone granule which contained at least 50 percent limestone fines and was spherical in shape, non-caking, non-hydroscopic, and sufficiently hard to insure that the granule would not break up when handled. Uniformity of size, shape and hardness are necessary in order to utilize such materials in bulk blending plants which have recently become widely used in the fertilizer industry.

We have surprisingly found that a high quality, non-caking granulated limestone soil improving material, can be produced from by-product limestone particles in relatively simple and inexpensive equipment. Hard granules of excellent physical integrity are formed. The granules of our process can readily be used in conventional fertilizer application equipment, and can be readily employed in bulk blending plants. Such products are rich in nitrogen containing compounds and calcium, both of which are valuable plant nutrients. The granules maintain their integrity in handling, but readily break up upon contact with moist soil releasing the plant nutrients.

Briefly, the process of the invention essentially comprises charging a binder material and water to a tumbling bed of particulate limestone. The granulation of the limestone is allowed to proceed until substantial equilibrium of granulation is approached; that is, the system is essentially optimized to a point where the rate of input of reactants to the tumbling bed is sufficient and the temperature is such as to yield a constant flow of the desired size of granules from the tumbling bed. The granules of the desired size are then normally separated by screening, those too small can be returned directly to the bed, and those too large can be crushed and returned to the bed. Other particulate fertilizer materials or fillers can be utilized in combination with limestone, but the limestone must include at least 70 percent by weight of the particulate material to be granulated. Moreover, the amount of moisture required to facilitate the granulation is minimal. Therefore, it is not necessary to dry the resultant product granules in order to render them sufficiently hard for commercial uses.

The compositions of the invention are granules which consist of limestone, optionally other particulate fillers, binder material, and water. The granules are almost perfect spheres, and are within the range of size which allows their successful use in conventional modern fertilizer application equipment. The granules to which the invention is directed contain limestone fines throughout the body of the granule intimately bonded together by the binder materials. The binder does not form a coat over a solid mass of limestone, nor does the granule have to be dusted to insure against the intrusion of atmospheric moisture into the granule. Likewise, the powdered limestone and binder material do not form a coat around a solid core of large binder particles.

Accordingly, it is an object of this invention to provide an economical process which optionally does not require a drying step for granulating particulate limestone to granules suitable for use in modern fertilizer applications. It is another object to provide a composition consisting essentially of particulate limestone, water, a binder material, and optionally other particulate filler or plant nutrient in granular form which is spherical in shape, extremely hard, and contains limestone particles bonded throughout by the binder material.

Other aspects, objects, and the several advantages of the invention will be apparent to one skilled in the art from this disclosure and the appended claims.

The limestone particles that can be employed in this invention can range from the finest powders to particles of about the size that would just pass a number 3 Tyler Screen. (Langs Handbook of Chemistry, 9th edition, Handbook Publishers, Inc., 1956, page 910). Suitable limestone compositions are common by-products of a number of industrial processes; in particular those processes wherein limestone rock is crushed to make gravel, chat, and the like. Such compositions can contain any particulate limestone that is commonly used for soil improvement. In addition, other particulate fillers or other particulate plant nutrient materials such as phosphates can be included, so long as sufficient limestone is included for the composition to be satisfactorily granulated by the process of this invention, normally at least about 70 weight percent of the total particulate material utilized is limestone. In general, we prefer to employ particulate materials that contain no particles larger than those that pass a number 8 Tyler Screen. The granules that we prefer to produce are those suitable for use in conventional application equipment, or about −4+14 Tyler Screen range.

According to the process of the invention, a tumbling bed of such limestone particles can be maintained in any rotating drum or other type reactor known to the art to maintain a tumbling bed. Though a batch process can be employed, a continuous process is normally preferred wherein granules tumble over a retaining ring at the lower end of a tumbling bed in a rotating drum type reactor, while fresh limestone particles are charged to the upper end of the tumbling bed and the binder material(s) and water are charged to the upper and/or middle part of the tumbling bed. Methods of charging fluid components and particulate solid components to tumbling beds in either batch or continuous processes are well known in the art.

Suitable binder materials to be employed in the process of the invention include ammonium nitrate and urea. Ammonium nitrate is presently preferred, but urea can be substituted for any or all of the ammonium nitrate whether utilized as solution or in prill form. The ammonium nitrate and/or urea binder for the limestone granules can be charged to the reactor in either of two ways depending upon the economics of the operation and the equipment available. If equipment to handle hot ammonium nitrate solution is available and this means is justified by economics, commercial hot solutions (80–83 percent $NH_4NO_3$) can be directly charged to the tumbling bed reactor. Otherwise, ammonium nitrate and/or urea can be charged to the tumbling bed reactor concurrently with proper amounts of water to also effect excellent granulation, or aqueous solution of urea and/or ammonium nitrate can be charged under suitable conditions. Such optional operation of our process is expected to find particular favor in smaller operations and in less developed areas.

In any event, the amount of water charged to the tumbling bed is in the range of 0.5 to 3.0 percent by weight of the total weight of materials introduced to the reactor. The amount of ammonium nitrate in the formulation charged to the reactor is in the range of 2 to 18 percent by weight of the total weight of materials, preferably 2–15 percent. The ammonium nitrate may be charged as solution or in prill form at temperatures in the range of 50 to 210° F. If the ammonium nitrate is charged in prill form, the water concurrently charged should be at temperatures in the range of 70 to 210° F. The amount of particulate limestone in the formulation preferably can be in the range of 79 to 97.5 percent by weight of the total weight of materials. If desired, other particulate plant nutrient materials such as ammonium phosphate may replace 9 to 27.5 percent by weight of the limestone charged to the reactor.

The temperature of the tumbling bed can be in the range of 40 to 210° F., with a preferred bed temperature within a range of about 70 to 175° F. Either superatmospheric or subatmospheric pressure can be employed, atmospheric pressure is normally preferred.

A suitable granulated limestone product of the process of this invention cannot have more than 0.5 percent (wt.) moisture. Of course, any of the above specified amounts of moisture in the materials charged can be employed if the granules are subjected to a drying step sufficient to lower the moisture content to at least 0.5 percent. However, this process is of particular value because it can optionally be operated without the use of expensive drying equipment. In such a case, though the exact values for optimum results will vary somewhat depending upon fineness of limestone particles, and the like, no more water than that sufficient to yield in the range of 0.15 to 0.5 percent moisture content of the product granules should be charged to the reactor in the form of aqueous ammonium nitrate and/or urea solution or as prills and water combination. The operating ranges for our process without a drying step can readily be determined from the above information.

A particular advantage of our process is that the granules of limestone and ammonium nitrate that are produced have integrity that meets or exceeds that necessary for a commercial product. Their physical properties include uniform size, non-caking characteristics, granular form, and capacity to easily break up upon contact with moist soil. Of extreme importance is that these granules are almost perfectly round, and are of unusual hardness. This insures that the granules will not be broken when mixed with other fertilizer materials in bulk blending operations. Likewise, the spherical shape of the granules insures that when the granules are being blended, a uniform rate of flow for the granules is provided, thus insuring that the proper proportion of the limestone granules is present in the resulting fertilizer blend.

Another advantage found in the process according to the invention is that, if desired, a product within a very narrow size range may be produced. For example, the system can be optimized to produce granules such that they will just pass a number 8 Tyler sieve, but will not pass a number 14 Tyler sieve. Optimization is accomplished by varying the method of charging components to the reactor, the temperature, the amount of each component introduced to the reactor, and the like. Generally, a charge of ammonium nitrate and/or urea in prill form along with water results in an granular size which is within a narrow range.

The granules produced contain 2–18 weight percent of binder material, at least about 70 weight percent of particulate limestone, 0.5 weight percent or less of water, and any remainder being other particulate materials. Preferably the granule contains 2–15 weight percent of binder material. If limestone is the only particulate material employed, the granules contain 2–18 weight percent of thermoplastic binder, 0.5 weight percent or less of water, and the remainder limestone. As previously mentioned, the granules are composed of limestone fines throughout the body of the granule bonded together by the binder material. To understand the composition of the granule, a simple illustration is offered. If a granule provided by the invention is cut into two equal parts, and then each part cut again (so one has equal quarters of the granule), analysis of each part would show that each contained the same proportion of materials. Thus, it is seen that the limestone particles and binder are evenly distributed throughout the volume of the granule.

Another illustration of the structure or each granule would be an analogy drawn to colloidal suspension or emulsions. If one considers that the binder material is analogous to the continuous phase in a colloidal suspension, and the particulate limestone analogous to the colloidal particles in the suspension, then one can visualize the uniform dispersion of the limestone particles throughout the granule.

A more comprehensive understanding of the invention can be obtained from the following illustrative examples which, however, are not intended to limit the invention.

EXAMPLE I

To a tumbling bed of limestone particles in a rotating drum granulater were charged ammonium nitrate and water in each of a series of runs. In Runs 6–16, the ammonium nitrate and water were charged as a solution while in Runs 1–5, such were charged as prills and water per se. The same limestone particulate product, which was obtained from a limestone crushing plant (composition: +6 Tyler, 0 wt. percent; −6+8, 3.5%; −8+14, 35.5%; −14, 61%), was employed in all runs. Such particulate product was the fine screenings of a limestone gravel crusher unit. Factors such as ratios of components charged and temperature of components charged were varied, as is presented by the following, Table I. The maximum temperature of the tumbling bed was 150° F. in all runs. Each batch was tumbled until an apparent substantial equalibrium of granulation was established. The tumbling bed was subjected to a drying stream of air from a heat gun to establish how a drying air stream would affect the formulations that were too wet to granulate properly. After substantial equilibrium of granulation was established in each run under the influence of the effects of the heat gun, the respective granulated product was removed and dried in a vacuum oven at 110° F. at 15–17 in. Hg vacuum for 16 hours before it was evaluated in terms of sieve size and granule hardness.

TABLE I

| Run No. | Formulation charged [1] | | | Screen wt. percent (Tyler) [3] of granules | | | | | Temperature of components charged in ° F.[4] | | | | Comments |
|---|---|---|---|---|---|---|---|---|---|---|---|---|---|
| | Limestone, wt. percent | AN,[2] wt. percent | H₂O, wt. percent | +4 | −4+6 | −6+8 | −8+14 | −14 | Total, −4+14 | Limestone | AN [2] | H₂O [1] | |
| 1 | 84.39 | 12.66 | 2.95 | 0.8 | 1.6 | 11.6 | 62.0 | 24.0 | 75.2 | RT | RT | RT | |
| 2 | 82.53 | 14.56 | 2.91 | 0.0 | 0.2 | 11.3 | 63.9 | 24.6 | 75.4 | RT | RT | RT | |
| 3 | 83.33 | 14.71 | 1.96 | 8.1 | 5.1 | 24.2 | 16.2 | 46.4 | 45.5 | 180 | 180 | RT | No heating during granulation. |
| 4 [5] | 83.68 | 12.55 | 3.77 | 3.0 | 3.5 | 21.2 | 61.5 | 10.8 | 86.2 | RT | RT | RT | Sticks—too wet to tumble freely. |
| 5 [5] | 79.07 | 13.95 | 6.98 | 26.9 | 33.1 | 28.7 | 11.1 | 0.2 | 72.9 | RT | RT | RT | Formed paste. |
| 6 | 96.42 | 2.98 | 0.60 | 6.5 | 7.0 | 7.5 | 31.5 | 47.5 | 46.0 | RT | 180 | Solution |  |
| 7 | 92.89 | 5.92 | 1.19 | 8.2 | 18.3 | 8.7 | 28.4 | 36.4 | 55.4 | RT | 180 | Solution |  |
| 8 | 89.39 | 8.84 | 1.77 | 9.2 | 7.1 | 8.7 | 32.6 | 42.4 | 48.4 | RT | 180 | Solution |  |
| 9 | 85.94 | 11.72 | 2.34 | 11.9 | 10.4 | 10.4 | 29.2 | 38.1 | 50.0 | RT | 180 | Solution |  |
| 10 | 95.81 | 2.96 | 1.23 | 2.9 | 4.9 | 8.8 | 39.6 | 43.8 | 53.3 | 160 | 160 | Solution |  |
| 11 | 95.51 | 2.96 | 1.48 | 9.4 | 7.9 | 10.4 | 33.2 | 39.1 | 51.5 | 160 | 160 | Solution |  |
| 12 | 93.27 | 5.77 | 0.96 | 13.2 | 10.0 | 4.2 | 30.3 | 42.3 | 44.5 | 160 | 190 | Solution |  |
| 13 | 92.82 | 5.74 | 1.44 | 17.2 | 10.5 | 11.9 | 27.7 | 32.7 | 50.1 | 160 | 170 | Solution |  |
| 14 | 92.38 | 5.71 | 1.91 | 14.0 | 10.1 | 12.1 | 35.3 | 28.5 | 57.5 | 160 | 160 | Solution |  |
| 15 | 91.94 | 5.69 | 2.37 | 19.6 | 10.8 | 12.7 | 30.4 | 26.5 | 53.9 | 160 | 160 | Solution |  |
| 16 | 91.51 | 5.66 | 2.83 | 21.9 | 12.2 | 13.2 | 31.2 | 21.5 | 56.6 | 160 | 160 | Solution |  |
| 17 [5] | 80.95 | 14.29 | 4.76 | 50.4 | 21.4 | 12.2 | 15.8 | 0.2 | 49.8 | RT | 160 | Solution | Too wet. |

[1] Relative amounts of each component as weight percent of total formulation.
[2] AN is ammonium nitrate.
[3] These values refer the weight percent of the product that will pass the respective Tyler sieves i.e., the "−4+6" column refers to the percent of the total product that will pass a number 4 Tyler sieve but not pass a number 6 Tyler sieve. (The number 6 sieve has a sieve opening of 3.3 mm., the number 4 sieve has a sieve opening of 4.70 mm., etc.).
[4] RT is room temperature.
[5] Control runs.

NOTE.—AN prills, and water were charged separately in Runs 1 through 3; AN and water were charged as a solution of such in Runs 6 through 17.

Granule hardness was determined by bringing different samples of a sieve fraction to different moisture levels and then testing the hardness of the granules of each moisture level by a standard granule hardness test method. Granule hardness data are presented by the following, Table II.

TABLE II

Effect of moisture on granule hardeners of AN-limestone granules (5% N as AN, −8+12 fraction)

Fracture pressure of typical granule in pounds
0.00% moisture AN-limestone _____ 8.0
0.21% moisture AN-limestone _____ 5.0
0.27% moisture AN-limestone _____ 4.0
0.32% moisture AN-limestone _____ 2.0
Control: 1.00% moisture AN-limestone _____ 1.0
For comparison:
  Typical commercial AN prill _____ 1.0
  Typical 18-46-0 fertilizer granule _____ 2.0

Data of Table I of this example demonstrates that particulate limestone can readily be agglomerated to commercial size granules by the process of the instant invention employing relatively small amounts of ammonium nitrate as a bonding agent. Runs 6–16 demonstrate that a liquid solution of ammonium nitrate in water can be employed while Runs 1–3 demonstrate that prills and water are also satisfactory. Control Runs 4, 5, and 17 demonstrate that water beyond the limits of the process is unsatisfactory since the limestone sticks together, forms oversize agglomerates, or is otherwise unsuitable. It should be noted that in Runs 1 and 2, about 63 percent of the granules were of the −8+14 Tyler size. Thus, the process can successfully and economically be operated to obtain a granule which is within a very narrow size range.

Data of Table II of this example demonstrate that granules of unusual and desirable hardness are produced by the process of this invention. Comparison of the granules produced in accordance with the invention with a typical ammonium nitrate prill and a fertilizer granule demonstrate that the resulting hardness of product is surprising. Such physical integrity results in a product which is non-caking and which can be easily handled without decomposition of the product.

EXAMPLE II

Limestone particles were agglomerated as in Example I except that urea instead of ammonium nitrate was employed. Results are presented in Table III.

Runs 18 and 19 of Table III demonstrate that urea can also be employed as a binding agent for limestone particles according to the process of this invention.

As will be apparent to those skilled in the art, other variations can be made in our invention without departing from the spirit or scope thereof.

TABLE III

| Run No. | Formulation charged | | | Screen wt. percent (Tyler) | | | | | Total, −4+14 | Temperature of components charged in ° F. | | |
|---|---|---|---|---|---|---|---|---|---|---|---|---|
| | Limestone | Urea | H₂O | +4 | −4+6 | −6+8 | −8+14 | −14 | | Limestone | Urea | H₂O |
| 18 | 91.10 | 6.67 | 2.23 | 8.3 | 8.3 | 9.9 | 29.2 | 44.3 | 47.4 | RT | 170 | Solution. |
| 19 | 88.47 | 8.64 | 2.87 | 15.1 | 9.9 | 13.0 | 37.5 | 24.5 | 60.4 | RT | 170 | Solution. |

We claim:
1. A process for the preparation of a fertilizer granule in the range of size which will pass a number 4 Tyler sieve but will not pass a number 14 Tyler sieve, which comprises charging to a granulation zone maintained at a temperature of from about 40° to about 210° F. a formulation consisting essentially of from 79 to 97.5 weight percent of particulate limestone having a particle size of from that which will just pass a number 3 Tyler sieve to the finest of limestone powders and a solution of from 2–18 weight percent of a binder material which is ammonium nitrate, urea, or mixtures thereof, and 0.5–3.0 weight percent water, allowing the formulation to reach an equilibrium of granulation and removing said fertilizer granule from said zone.

2. The process of claim 1 wherein the limestone in the formulation is replaced by an amount of another particulate soil conditioning material such that the total amount of limestone is not less than 79 weight percent.

3. The process of claim 1 wherein the binder material is ammonium nitrate.

4. The process of claim 1 wherein the binder material is urea.

5. The process of claim 2 wherein the particulate soil conditioning material is ammonium phosphate.

6. The precess of claim 1 wherein the formulation consists essentially of at least 90 weight percent of said particulate limestone, from 2 to about 7 percent ammonium nitrate or urea and about 0.5 to about 3.0 weight percent water.

7. The process of claim 1 wherein the granulation zone is maintained at a temperature in the range of from about 70° to about 175° F.

References Cited
UNITED STATES PATENTS

| | | | |
|---|---|---|---|
| 3,049,420 | 8/1962 | Weiland | 71—60 |
| 2,041,088 | 5/1936 | Pfirrmann | 71—60 |
| 2,155,372 | 4/1939 | Beekhuis, Jr. | 71—60 |
| 2,118,439 | 5/1938 | Lawrence | 71—28 |
| 3,348,938 | 10/1967 | Sherrington et al. | 71—28 |
| 3,408,169 | 10/1968 | Thompson et al. | 71—28 |
| 3,421,878 | 1/1969 | Zahnstecher | 71—60 |

CHARLES N. HART, Primary Examiner

U.S. Cl. X.R.

71—30, 59, 63, 64 DA